US009632256B2

(12) United States Patent
Yang et al.

(10) Patent No.: US 9,632,256 B2
(45) Date of Patent: Apr. 25, 2017

(54) OPTICAL FIBER ADAPTER WITH SHUTTER MEMBER

(71) Applicant: PROTAI PHOTONIC CO., LTD., New Taipei (TW)

(72) Inventors: Jyh-Cherng Yang, Taipei (TW); Yu-Kai Chen, Taipei (TW)

(73) Assignee: Protai Photonic Co., Ltd., New Taipei (TW)

( * ) Notice: Subject to any disclaimer, the term of this patent is extended or adjusted under 35 U.S.C. 154(b) by 0 days.

(21) Appl. No.: 14/816,193

(22) Filed: Aug. 3, 2015

(65) Prior Publication Data
US 2016/0306121 A1    Oct. 20, 2016

(30) Foreign Application Priority Data

Apr. 17, 2015   (TW) .............................. 104112528 A (51) Int. Cl.
*G02B 6/38* (2006.01)
(52) U.S. Cl.
CPC ................................. *G02B 6/3825* (2013.01)
(58) Field of Classification Search
None
See application file for complete search history.

(56) References Cited

U.S. PATENT DOCUMENTS

| 6,179,477 | B1 * | 1/2001 | De Marchi | G02B 6/3831 385/56 |
| 6,866,424 | B2 * | 3/2005 | Tanaka | G02B 6/3825 385/55 |
| 7,785,018 | B2 * | 8/2010 | Jones | G02B 6/3849 385/58 |
| 8,628,254 | B2 * | 1/2014 | Lin | G02B 6/3825 385/55 |
| 8,851,763 | B2 * | 10/2014 | Lin | G02B 6/3825 385/58 |

(Continued)

FOREIGN PATENT DOCUMENTS

TW    201312186 A    3/2013

*Primary Examiner* — Tina Wong
(74) *Attorney, Agent, or Firm* — Rosenberg, Klein & Lee (57) ABSTRACT

An optical fiber adapter according to the present disclosure includes a main body, an inner housing, a movable member, an elastic shutter member, a spring and a cover plate. The main body has an axial accommodation room and an access opening is provided on a first wall of the main body. The inner housing is placed within the accommodation room and includes a hollow cylinder extending from the front surface of a flange. The movable member is positioned within the accommodation room and is configured to be moved toward a second opening of the accommodation room. The shutter member is positioned within the accommodation room and includes a fixed portion, a shutter plate and a connecting portion. The fixed portion is fixed at the movable member and is moved with the movable member. The connecting portion connects the fixed portion with the shutter plate. The shutter plate extends from the connecting portion and arrives in front of an opening of the hollow cylinder. The spring is positioned within the accommodation room to push the movable member toward a first opening of the accommodation room. The cover plate is placed to cover the access opening on the first wall.

10 Claims, 10 Drawing Sheets

(56) References Cited

U.S. PATENT DOCUMENTS

| | | | |
|---|---|---|---|
| 9,196,997 B2 * | 11/2015 | Sanders | G02B 6/3849 |
| 2008/0267566 A1 * | 10/2008 | En Lin | G02B 6/3825 385/53 |
| 2012/0321266 A1 * | 12/2012 | Lin | G02B 6/3825 385/134 |

* cited by examiner

OPTICAL FIBER ADAPTER WITH SHUTTER MEMBER

RELATED APPLICATION

The present application is based on and claims priority to Taiwanese Application Number 104112528, filed Apr. 17, 2015, the disclosure of which is hereby incorporated by reference herein in its entirety.

BACKGROUND

1. Technical Field

The disclosure relates to an optical fiber adapter, and more particularly, to an optical fiber adapter with a shutter member.

2. Description of the Related Art

Recently, the optical fiber has been widely used as signal transmission media because of its high bandwidth and low loss nature. In order to transmit over a longer distance without the need of repeaters, it is common to use a high power diode laser to launch a laser beam into the optical fiber. However, the high power laser beam used to carry information is usually invisible. In other words, the human eyes will be unable to sense the high power laser beam if it leaves from the open end of a fiber cable. Thus, it is required to obstruct the high power laser beam to avoid hurting the eyes when the laser beam leaves from an optical fiber.

Figure 1:
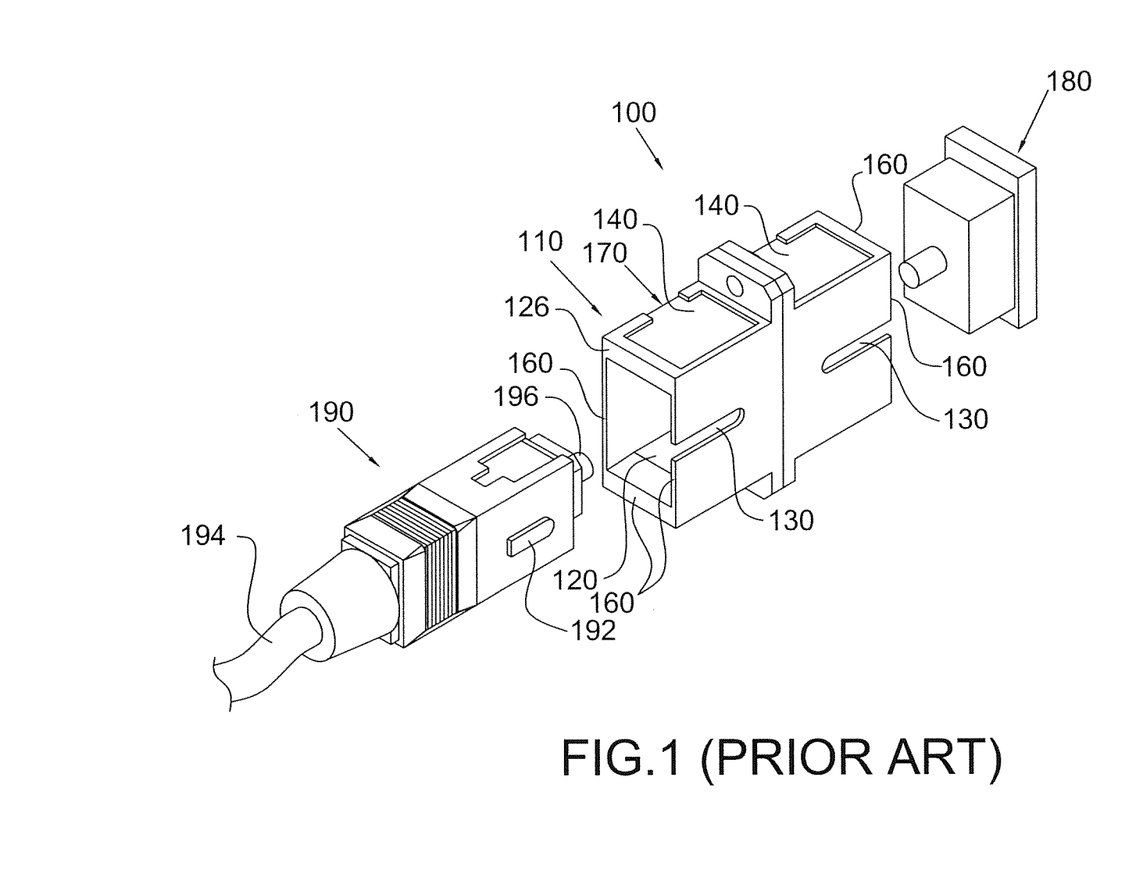
FIG. 1 is an elevated perspective view illustrating a conventional optical fiber adapter and a conventional optical fiber connector.

Referring to FIG. 1, a conventional fiber adapter 100 includes a housing 110 having a plurality of side walls 160. The side walls 160 define a receiving recess 120. One of the side walls 160 is provided with a slot 130 for mating with the key 192 of the connector 190 when the connector 190 is inserted into the receiving recess 120. In addition, the outer surfaces of two opposite side walls 160 are provided with recesses 140 that a clip (not shown in the figure) can be disposed thereon to facilitate the adapter 100 to be mounted on a panel.

In general, the adapter 100 further has another set of side walls 160 that defines another receiving recess 120. The two receiving recesses 120 are opposite and can respectively receive a connector 190. Of course, the two receiving recesses 120 of the adapter 100 can be designed to mate with two different types of connectors. The fiber connector 190 is always attached to one end of a fiber cable 194 and a light beam can propagate down the fiber cable 194 and emit from the ferrule 196 of the connector 190. Likewise, a light beam can be coupled into the fiber cable 194 from the end face of the ferrule 196.

When the adapter 100 is used to couple two connectors 190 together, the two connectors 190 are respectively inserted into the receiving recesses 120. The ferrules 196 of the connectors 190 thus slide into a hollow sleeve (not shown in the figure) and are brought into axial alignment and contact with each other. A light beam will be able to propagate from the fiber cable 194 of a connector 190 through the interface between the two ferrules 196 and then reach the fiber cable 194 of the other connector 190, and vice versa.

When one connector 190 is disconnected from the adapter 100, the light beam originally propagating from the connector 190 still kept in the adapter 100 to the presently disconnected connector 190 will now leave the ferrule 196 and emit from the receiving recess 120. If the emitted light beam is high power and not obstructed, a lasting exposure to such light beam is harmful to people, particularly to the eyes. Thus, to avoid exposing to the high-power light beam, it is common to use a cap 180 to block up the unused receiving recess 120. This can obstruct the light beam and also prevent the receiving recess 120 from dust. If a connector 190 would like to be mated with the adapter 100, the cap 180 is required to be removed. However, the cap 180 is apt to get lost and it is still possible to expose the eyes to the light beam during mating.

Figure 2:
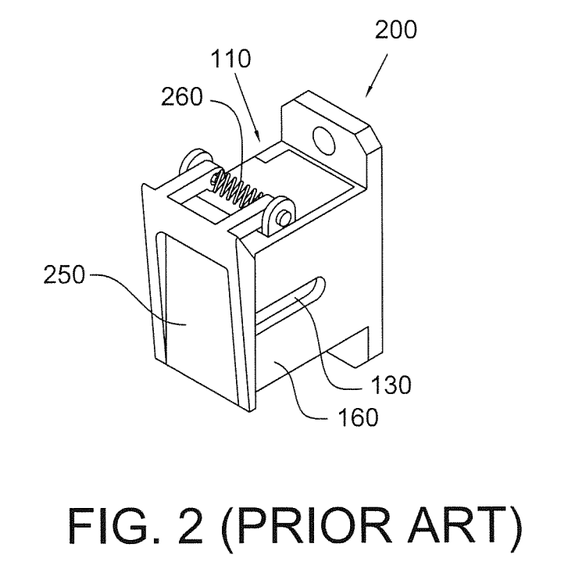
FIG. 2 is an elevated perspective view of a conventional optical fiber adapter with a cover for obstructing the light beams emitted from the receiving recess.

Referring to FIG. 2, a conventional fiber adapter 200 is generally the same as the adapter 100 but further includes a cover 250 pivotally connected to the housing 110. The cover 250 covers the receiving recess 120 in its closed position. A spring 260 can force the cover 250 to be pivoted to its closed position when the receiving recess 120 is not mated with a connector 190. Thus, the cover 250 is capable of obstructing the light beam emitted from the receiving recess 120 in its closed position. If a user would like to mate a connector 190 with the adapter 200, he is first required to lift the cover 250 from its closed position and then to insert the connector 190 into the receiving recess 120. Upon pulling out the connector 190, the cover 250 is pivoted to cover the receiving recess 120 through the spring 260. As a result, the user has no chance to expose to the high-power light beam. However, the construction of the adapter 200 is much more complex than that of the adapter 100.

Figure 3:
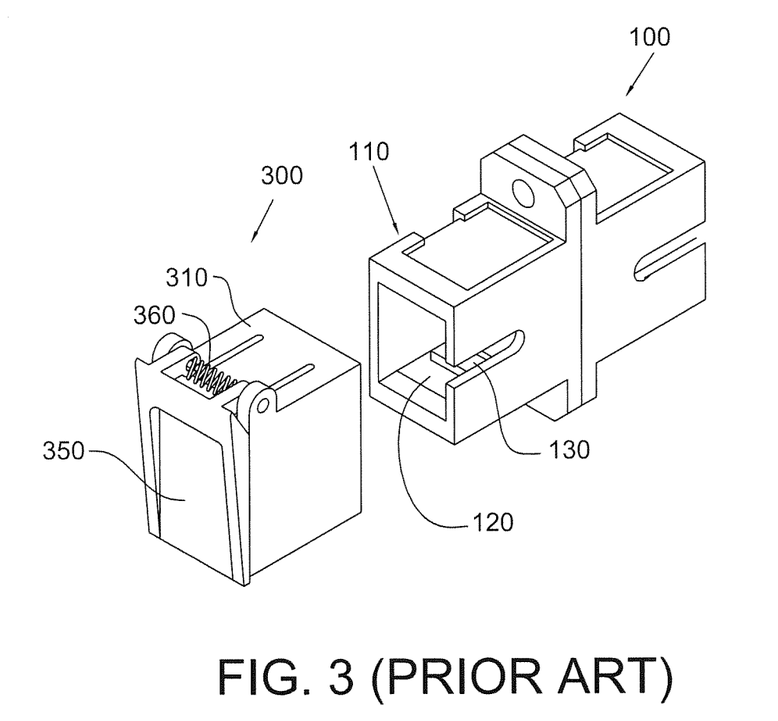
FIG. 3 is an elevated perspective view of a conventional protection cap for an optical fiber adapter.

Referring to FIG. 3, a conventional protection cap 300 for the fiber adapter 100 includes a hollow housing 310 with two opposing openings and a cover 350 pivotally connected to the housing 310. The cover 350 is pivoted to cover one of the two openings through a spring 360. The protection cap 300 can be put on the adapter 100 and cover the outer surfaces of the side walls 160 and the receiving recess 120 of the adapter 100. When a user would like to mate a connector 190 with the adapter 200, he is required to lift the cover 350 from its closed position and then to insert the connector 190 into the receiving recess 120. Likewise, upon pulling out the connector 190, the cover 350 is pivoted to cover the receiving recess 120 by the spring 360. As a result, the user has no chance to expose to the high-power light beam emitted from the receiving recess 120. However, the structure of the protection cap 300 is somewhat complex and therefore it is not inexpensive. The introduction of the protection cap 300 to obstruct the light beam will cost much.

Accordingly, there exists a need to provide a solution to solve the aforesaid problems.

SUMMARY

The present disclosure provides a shutter member for an optical fiber adapter that may obstruct the light beams emitted from the accommodation room thereby preventing the eyes from exposure to the light beams.

In one embodiment, the optical fiber adapter of the present disclosure includes a main body, an inner housing, a movable member, an elastic shutter member, a spring and a cover plate. The main body has an axial accommodation room and an access opening is provided on a first wall of the main body. The inner housing is placed within the accommodation room and includes a hollow cylinder extending from the front surface of a flange. The movable member is positioned within the accommodation room and is configured to be moved toward a second opening of the accommodation room. The shutter member is positioned within the accommodation room and includes a fixed portion, a shutter plate and a connecting portion. The fixed portion is fixed at the movable member and is moved with the movable member. The connecting portion connects the fixed portion with the shutter plate. The shutter plate extends from the connecting portion and arrives in front of an opening of the hollow cylinder. The spring is positioned within the accommodation room to push the movable member toward a first opening of the accommodation room. The cover plate is placed to cover the access opening on the first wall.

The foregoing, as well as additional objects, features and advantages of the disclosure will be more readily apparent from the following detailed description, which proceeds with reference to the accompanying drawings.

DETAILED DESCRIPTION OF THE PREFERRED EMBODIMENT

Figure 4:
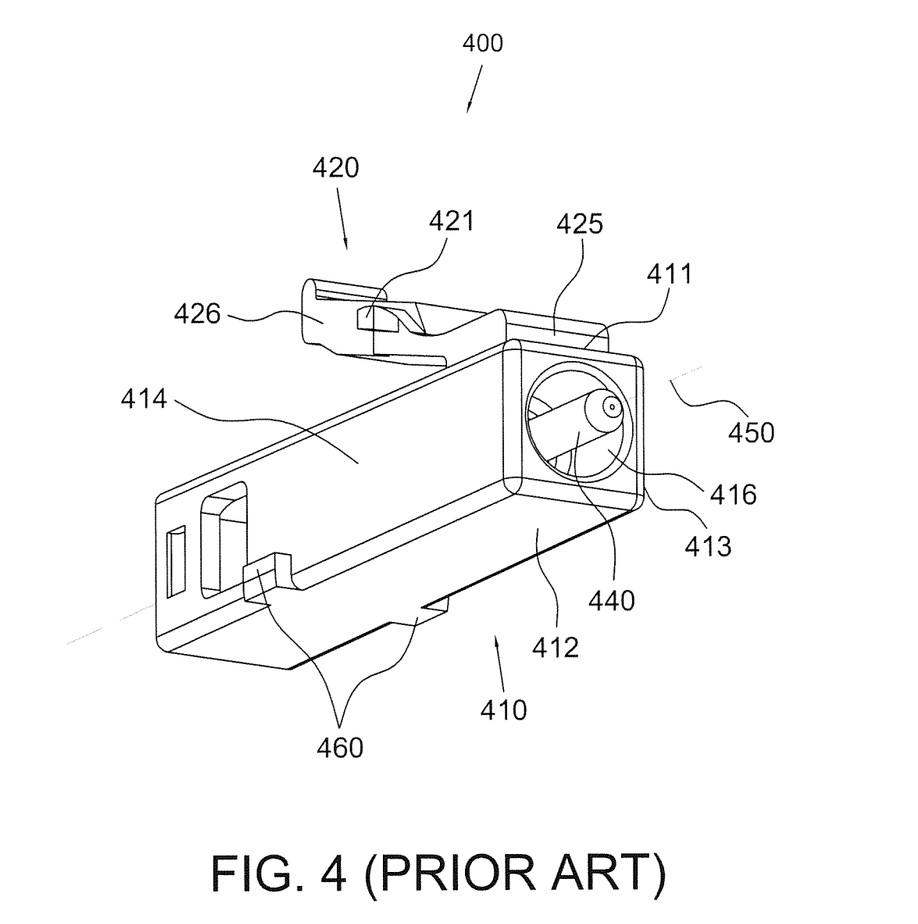
FIG. 4 is an elevated perspective view of a conventional LC type optical fiber connector.

Referring to FIG. 4, a conventional LC type optical fiber connector 400 has a generally rectangular shape with a square cross section. The connector 400 includes a rectangular hollow housing 410 comprised of a top side-wall 411, a bottom side-wall 412, a right side-wall 413 and a left side-wall 414, wherein the right side-wall 413 is opposite to the left side-wall 414 and connects with the bottom side-wall 412 and the top side-wall 411. A latch 420 is molded into the top side-wall 411 and includes a living hinge 425 which allows the tab 426 to be moved up and down in a direction perpendicular to the central axis 450-450 of the connector 400. The latch 420 also includes a pair of protrusions 421 that are positioned on opposing sides of the tab 426. In addition, a ferrule 440 protrudes from a circular opening 416 on the front end of the housing 410. A spring is located inside the housing 410 to allow the ferrule 440 to move back and forth through the opening 416 (not shown in the figure). A pair of protrusions 460 is positioned on the right side-wall 413 and left side-wall 414, respectively.

Figure 5:
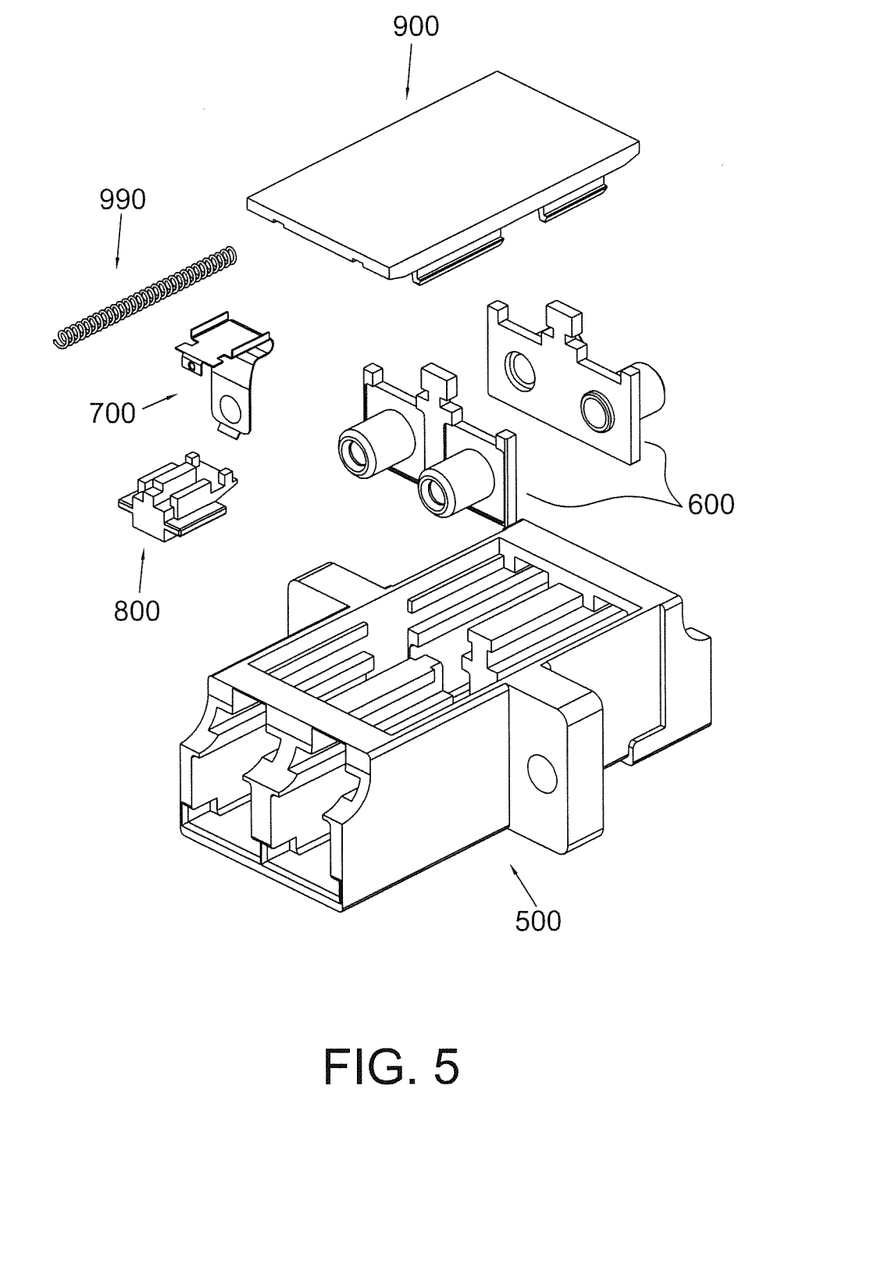
FIG. 5 is an exploded view of the optical fiber adapter of the present disclosure.
Figure 6:
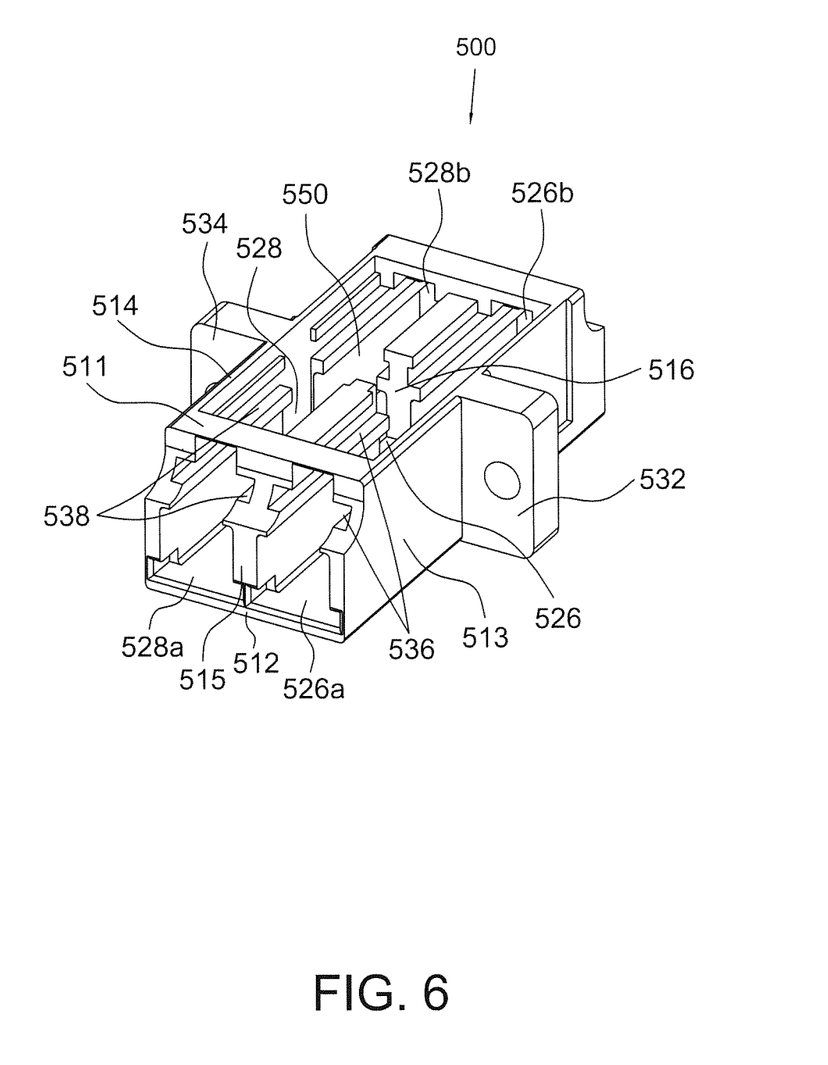
FIG. 6 is an elevated perspective view of the main body of the optical fiber adapter of the present disclosure.

Reference is now made to FIG. 5, the optical fiber adapter according to the present disclosure may be an LC duplex type optical fiber adapter and includes a unitary molded plastic main body 500, a pair of inner housings 600, an elastic shutter member 700, a movable member 800, a cover plate 900 and a spring 990. Reference is made to FIG. 6, the main body 500 is substantially rectangular and has an accommodation room defined by a top wall 511, a bottom wall 512, a right wall 513 and a left wall 514, wherein the top wall 511 faces the bottom wall 512 and connects with the right wall 513 and left wall 514. The accommodation room is divided into two halves by a compartment wall 515 that is parallel to the right wall 513 and left wall 514 and connects with the top wall 511 and bottom wall 512. A break 516 is formed in the middle section of the compartment wall 515. The half of the accommodation room defined by the top wall 511, bottom wall 512, compartment wall 515 and right wall 513 is named as the right accommodation room 526 and the other half of the accommodation room defined by the top wall 511, bottom wall 512, compartment wall 515 and left wall 514 is named as the left accommodation room 528. The right accommodation room 526 has opposing first right opening 526a and second right opening 526b in an axial direction. Similarly, the left accommodation room 528 has opposing first left opening 528a and second left opening 528b in the axial direction. Located on the exterior of the main body 500 is a pair of tabs 532 and 534. One tab 534 is located on the left wall 514 and the other tab 532 is located on the right wall 513. The tabs 532 and 534 are operative in supporting the adapter on a surface. An access opening 550 is located on the top wall 511 to allow the inner housings 600 to place within the accommodation room of the main body 500. A guide groove 536 is formed on each of the right and compartment walls 513, 515 within the right accommodation room 526. The two guide grooves 536 extend from the first right opening 526a toward the second right opening 526b and arrive at the break 516. A guide groove 538 is formed on each of the left and compartment walls 514, 515 within the left accommodation room 528. The two guide grooves 538 extend from the first left opening 528a toward the second left opening 528b and arrive at the break 516.

Figure 7:
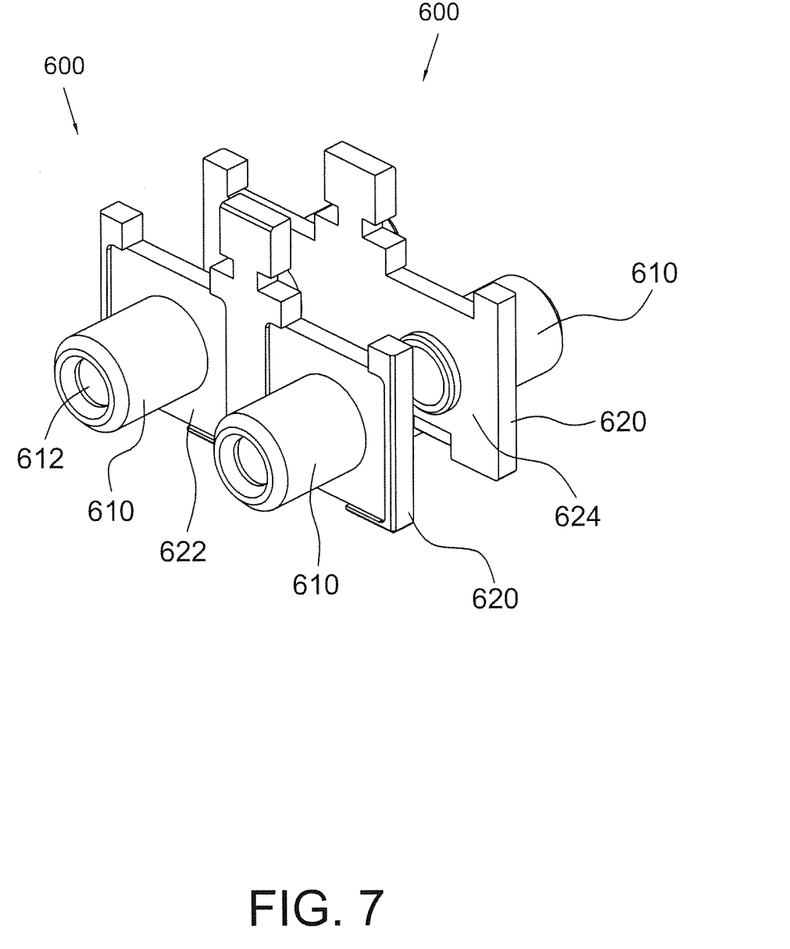
FIG. 7 is an elevated perspective view of the inner housings of the optical fiber adapter of the present disclosure.

Reference is now made to FIG. 7, which illustrates the inner housings 600 of the present disclosure. The two inner housings 600 have the same shape and are constructed of plastics by an injection molding process. Each of the inner housings 600 includes two hollow cylinders 610 extending from the front surface 622 of a generally rectangular flange 620. The hollow cylinder 610 has a front opening 612 opposing to a rear opening located at the flange 620. The two inner housings 600 may be connected together at their respective flanges 620 so as to connect two the cylinders 610 with the other two cylinders 610 to define two common cylinders. The two flanges 620 together define a thickness that is equal to the width of the break 516. When the two inner housings 600 are placed within the main body 500, the two cylinders 610 of one the inner housing 600 are respectively aligned with the two cylinders 610 of the other inner housing 600 to define the two common cylinders.

Figure 8A:
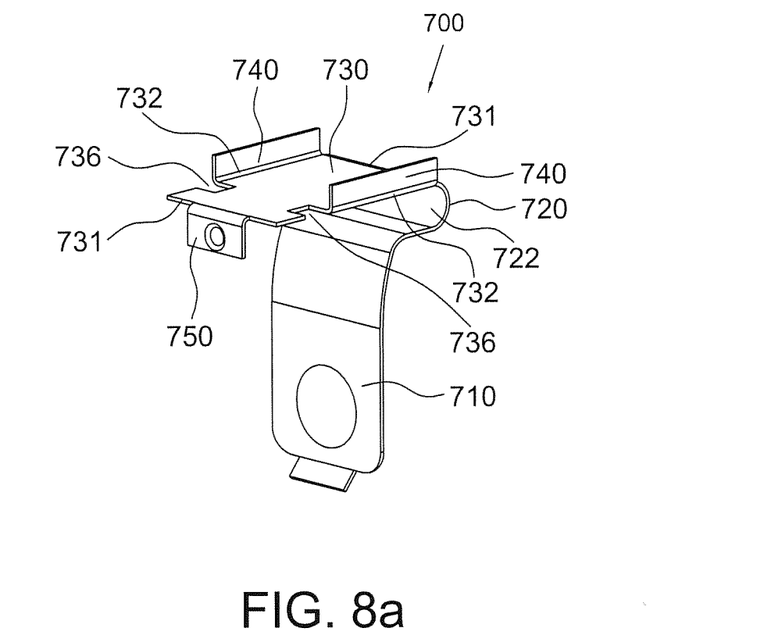
FIG. 8a is an elevated perspective view of the shutter member of the optical fiber adapter of the present disclosure.
Figure 8B:
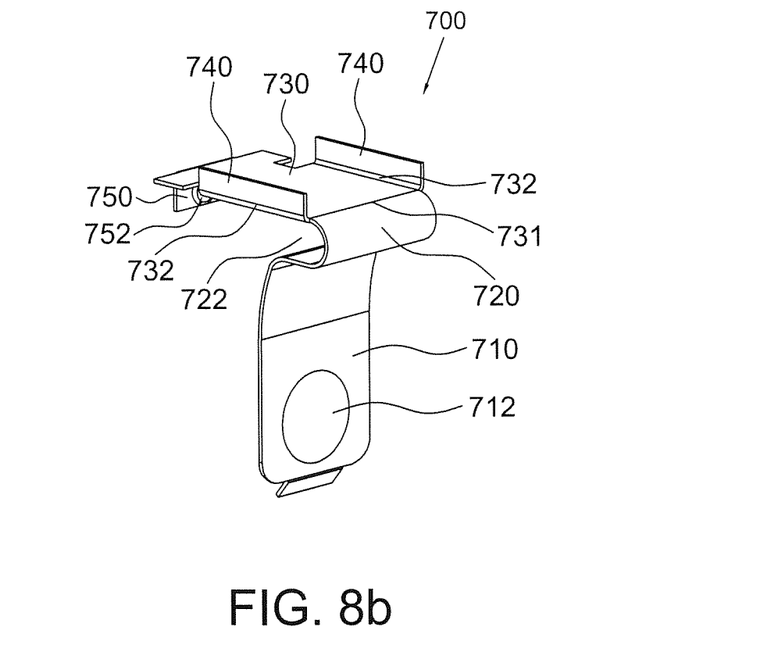
FIG. 8b is another elevated perspective view of the shutter member of the optical fiber adapter of the present disclosure.

Reference is made to FIGS. 8a and 8b, which illustrate the elastic shutter member 700 of the present disclosure. The shutter member 700 is integrally formed with metal and includes a shutter plate 710, a connecting portion 720 and a fixing portion 730. The connecting portion 720 connects the fixing portion 730 with the shutter plate 710 and is generally U-shaped. That is, the connecting portion 720 is curved and has a notch 722. The shutter plate 710 may contain a single plate or several plates. The shutter plate 710 may move with respect to the fixing portion 730. The shutter plate 710 is moved close to the fixing portion 730 with a push force and quickly moves back when the push is withdrawn. A circular bump 712 is formed on the shutter plate 710 to face the front opening 612 of one of the cylinders 610. The fixing portion 730 is plate-like and has a rectangular shape. The fixing portion 730 has a pair of longitudinal sides 732 connecting with a pair of transverse sides 731, wherein one of the transverse sides 731 connects with the connecting portion 720 and an engagement protrusion 750 is provided at the other transverse side 731. A circular bump 752 is formed on the engagement protrusion 750. The fixing portion 730 has at least one, for example two rectangular engagement holes 736 respectively near the longitudinal sides 732 thereof. To enhance the rigidity of the fixing portion 730, two rectangular enhancement portions 740 extend perpendicularly from the longitudinal sides 732, respectively.

Figure 9A:
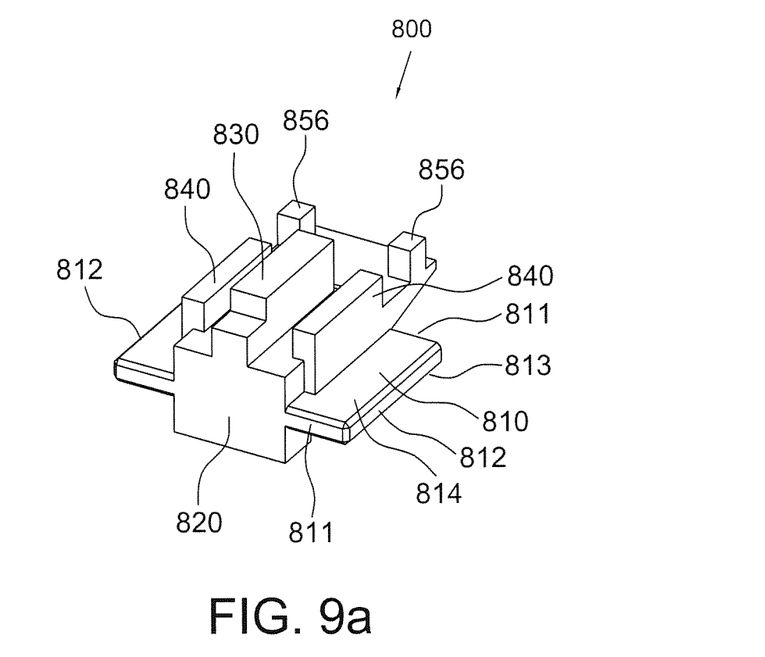
FIG. 9a is an elevated perspective view of the movable member of the optical fiber adapter of the present disclosure.
Figure 9B:
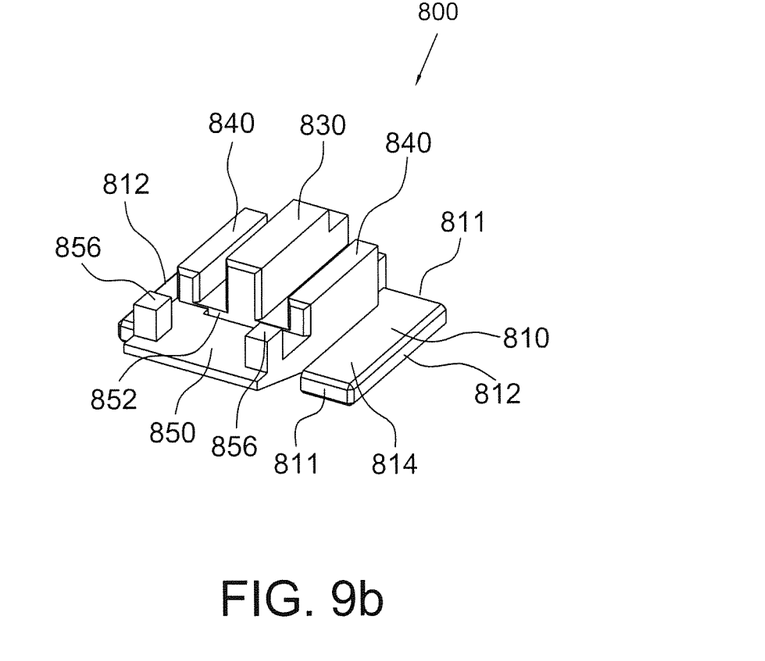
FIG. 9b is another elevated perspective view of the movable member of the optical fiber adapter of the present disclosure.

Reference is made to FIGS. 9a and 9b, which illustrate the movable member 800 of the present disclosure. The movable member 800 has a base 810. The base 810 is of rectangular shape and has a pair of longitudinal sides 812 connecting with a pair of transverse sides 811. A rectangular lower block 820 is formed adjacent to the rear transverse side 811 on the lower surface 813 of the base 810. A longitudinal upper block 830 is formed on the upper surface 814 of the base 810. Two longitudinal guide pins 840 are provided on two opposing sides of the upper block 830 on the upper surface 814 of the base 810. A fixing portion 850 is coupled to and protrudes from the front transverse side 811 of the base 810. Two rectangular bumps 856 are formed on the fixing portion 850 to respectively engage with the two engagement holes 736. An engagement hole 852 is formed on the fixing portion 850 to engage with the engagement protrusion 750 at the shutter member 700.

Figure 10:
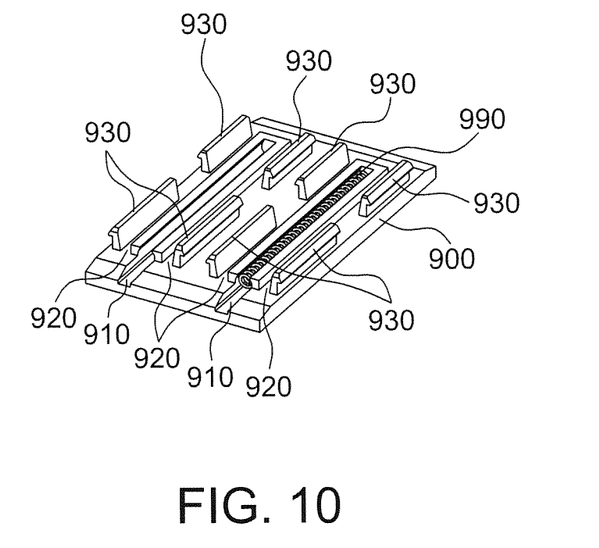
FIG. 10 is an elevated perspective view of the cover plate and spring of the optical fiber adapter of the present disclosure, wherein the spring is attached to the cover plate.

Reference is made to FIG. 10, which illustrates the cover plate 900 of the present disclosure. The cover plate 900 is of rectangular shape and has two longitudinal accommodation grooves 910 formed thereon to receive the spring 990. The upper block 830 of the movable member 800 may also slide in the accommodation grooves 910 to push against the spring 990. Two guide grooves 920 are formed on two opposing sides of each of the accommodation grooves 910 on the cover plate 900 to respectively allow the longitudinal guide pins 840 of the movable member 800 to slide therein. The cover plate 900 is further provided with a plurality of longitudinal engagement portions 930, such as hooks to respectively engage with the right, left and compartment walls 513, 514, 515.

Figure 11:
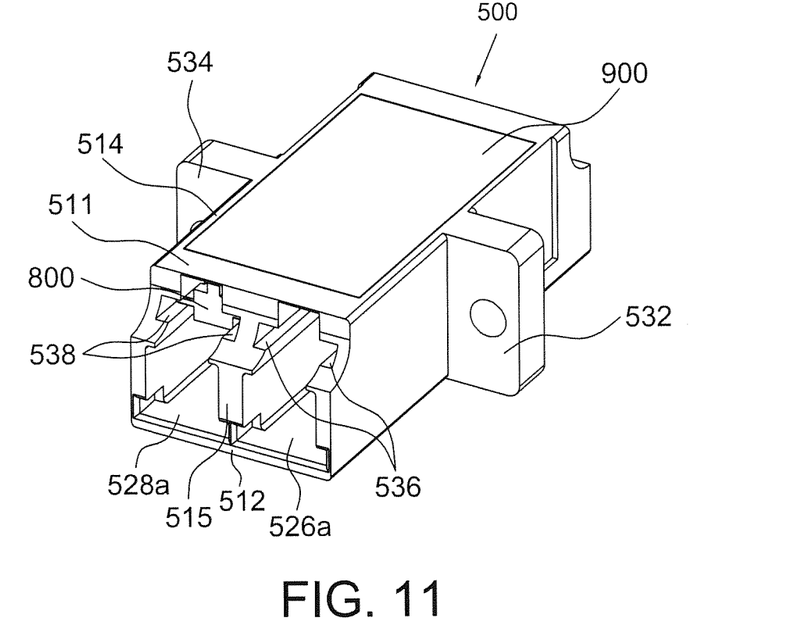
FIG. 11 is an elevated perspective view of the optical fiber adapter of the present disclosure.

When desiring to assemble the optical fiber adapter of the present disclosure, the engagement protrusion 750 of the shutter member 700 is inserted into and engages with the engagement hole 852. Meanwhile, the bumps 856 of the movable member 800 are brought into engagement with the engagement holes 736 of the shutter member 700, respectively. This way the fixing portion 730 of the shutter member 700 may be securely attached to the movable member 800. Afterward the assembly of the shutter member 700 and movable member 800 is inserted into the left accommodation room 528 by the first insertion of the movable member 800 through the access opening 550 from the middle section of the left accommodation room 528 near the break 516 in the compartment wall 515. The longitudinal sides 812 of the base 810 at the movable member 800 are respectively inserted into the two guide grooves 538 within the left accommodation room 528 and the movable member 800 is pushed toward the first left opening 528a. Next the two inner housings 600 are connected together at their respective flanges 620. The fixing portion 730 and shutter plate 710 of the shutter member 700 in the main body 500 are then pulled up and the two inner housings 600 are inserted into the main body 500 through the access opening 550 such that the two flanges 620 are inserted into the break 516 in the compartment wall 515. Afterward the fixing portion 730 together with the shutter plate 710 is pushed down and the cover plate 900 provided with the spring 990 is placed to cover the access opening 550 such that the engagement portions 930 respectively engage with the right, left and compartment walls 513, 514, 515 of the main body 500 and the upper block 830 at the movable member 800 is placed in the accommodation groove 910 equipped with the spring 990 to push against one end of the spring 990. When the cover plate 900 is placed to cover the access opening 550, a part of the spring 990 is positioned right above the fixing portion 730 of the shutter member 700. In addition, the movable member 800 together with the shutter member 700 is pushed toward the first left opening 528a by the spring 990 and the bump 712 on the shutter plate 710 is located in front of the front opening 612 of the cylinder 610 in the left accommodation room 528. The upper block 830 at the movable member 800 is placed in the accommodation groove 910 to push against one end of the spring 990 and the two guide pins 840 are respectively placed in the guide grooves 920 on the opposing sides of the spring 990. FIG. 11 illustrates the optical fiber adapter of the present disclosure.

Figure 12:
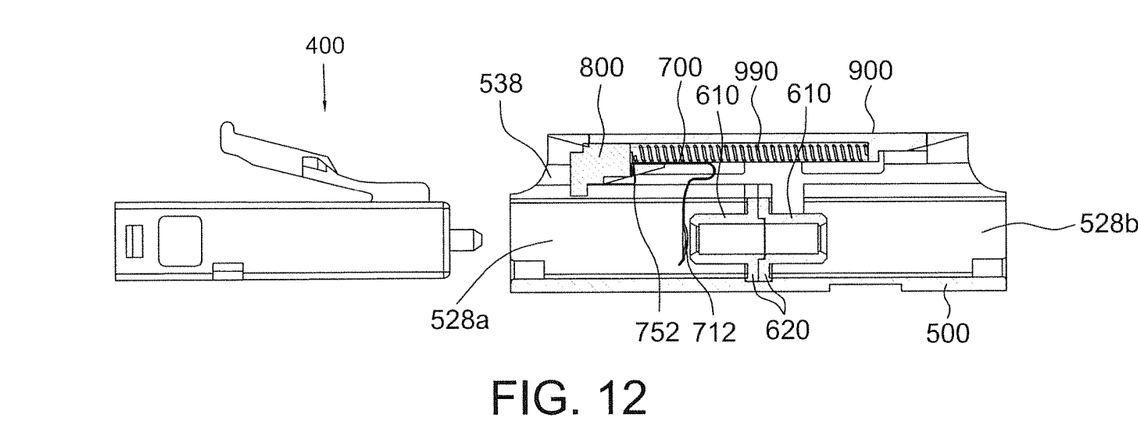
FIGS. 12 and 13 illustrate how to mate an optical fiber connector with the optical fiber adapter of the present disclosure.

Reference is made to FIG. 12, when the optical fiber connector 400 of FIG. 4 is not inserted into the main body 500 from the first left opening 528a, the spring 990 will push the movable member 800 together with the shutter member 700 toward the first left opening 528a. Meanwhile, a part of the shutter plate 710 will be located in front of the front opening 612 of the cylinder 610 facing the first left opening 528a in the left accommodation room 528. When an optical fiber connector is inserted into the main body 500 from the second left opening 528b, the light beams that emit from the optical fiber connector and then propagate out from the front opening 612 of the cylinder 610 will be obstructed by the shutter plate 710. As a result, the occurrence of exposure to the harmful light beams may be avoided.

Figure 13:
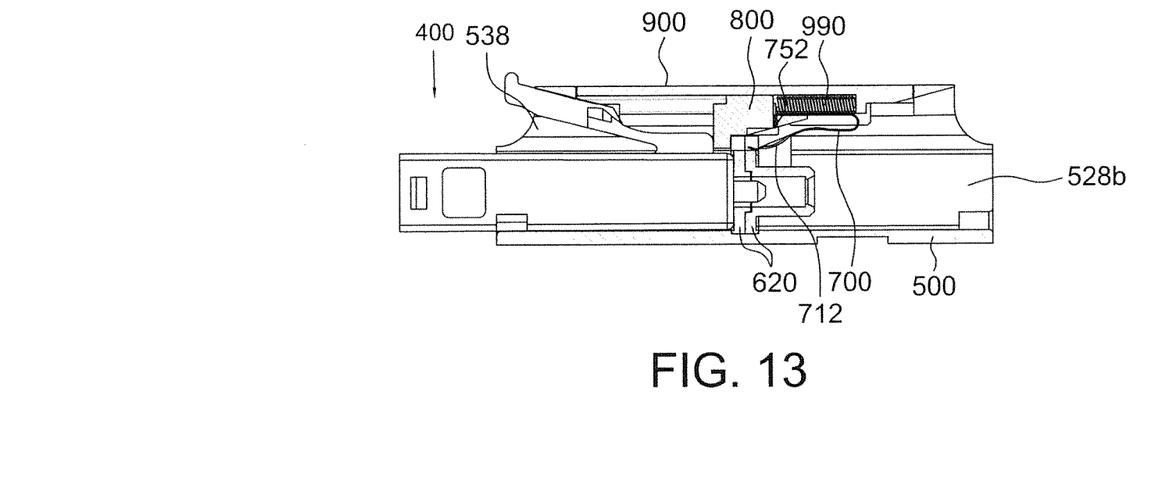

Reference is made to FIGS. 12 and 13, when the optical fiber connector 400 of FIG. 4 is inserted into the main body 500 from the first left opening 528a, the living hinge 425 of the latch 420 at the optical fiber connector 400 will confront the lower block 820 of the movable member 800. Meanwhile, the longitudinal sides 812 of the base 810 at the movable member 800 will respectively slide in the two guide grooves 538 and the guide pins 840 will respectively slide in the two guide grooves 920 on the opposing sides of the spring 990 so that the movable member 800 may be moved toward the second left opening 528b smoothly. The upper block 830 at the base 810 will slide in the accommodation groove 910 and press against the spring 990. The pushed movable member 800 drives the shutter member 700 to move and the shutter plate 710 is bent and slides on outer surface of the cylinder 610 facing the first left opening 528a in the left accommodation room 528. When the optical fiber connector 400 is moved to being in place, the shutter plate 710 is pushed past the flange 620 facing the first left opening 528a and arrives at the space between the fixing portion 730 and the cylinder 610 facing the second left opening 528b in the left accommodation room 528. Upon pulling out the optical fiber connector 400 from the main body 500, the pressed spring 990 will spring up to push the movable member 800 toward the first left opening 528a to an original position. The shutter member 700 is driven to move to its original position and the elastic shutter plate 710 will quickly spring up to an original position to obstruct the light beams emitted from the cylinder 610 facing the first left opening 528a as a result of elasticity. As a result, the occurrence of exposure to the harmful light beams may be avoided.

Although the shutter member 700 is installed in the left accommodation room 528 of the main body 500 as described in the present disclose, it will be appreciated that the shutter member 700 may be arranged in either or both of right and left accommodation rooms 526, 528. In addition, it will also be appreciated that although the disclosure has been explained with the LC duplex adapter, the shutter member 700 of the present disclosure may be used in LC simplex adapter, SC duplex adapter, SC simplex adapter, or other types of adapters.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An optical fiber adapter for optically coupling two optical fiber connectors with each other, the optical fiber adapter comprising:
    a main body having an accommodation room defined by a first wall, a second wall, a third wall and a fourth wall, the first wall facing the third wall and connecting with the second and fourth walls, wherein the accommodation room has opposing first and second openings in an axial direction to allow the two optical fiber connectors to insert into the accommodation room to mate with each other, and an access opening is formed within the first wall;
    an inner housing positioned within the accommodation room, the inner housing comprising:
        a flange having a front surface; and
        a hollow cylinder extending from the front surface of the flange toward the first opening of the accommodation room, the hollow cylinder having an opening facing the first opening of the accommodation room;
        wherein the access opening is formed to allow the inner housing to place within the accommodation room of the main body;
    a movable member positioned within the accommodation room, wherein when one of the optical fiber connectors is inserted into the accommodation room from the first opening, the movable member is pushed toward the second opening of the accommodation room;
    an elastic shutter member, comprising:
        a fixing portion attached to the movable member to move in relation to the movable member;
        a shutter plate; and
        a connecting portion connecting the fixing portion with the shutter plate;
        wherein the shutter plate extends from the connecting portion to a position in front of the opening of the hollow cylinder;
    a spring positioned within the accommodation room to push the movable member toward the first opening of the accommodation room; and
    a cover plate positioned to cover the access opening on the first wall.

2. The optical fiber adapter as claimed in claim 1, wherein a guide groove is formed within each of the second and fourth walls for the movable member to slide therein.

3. The optical fiber adapter as claimed in claim 1, wherein an accommodation groove is formed within the cover plate to receive the spring.

4. The optical fiber adapter as claimed in claim 3, further comprising:
    a block coupled to the movable member to push against one end of the spring.

5. The optical fiber adapter as claimed in claim 1, further comprising a guide pin coupled to the movable member, wherein a guide groove is formed within the cover plate for the guide pin to slide therein.

6. The optical fiber adapter as claimed in claim 1, wherein the movable member further moves the shutter plate past the flange of the inner housing when one of the optical fiber connectors is inserted into the accommodation room from the first opening to push the movable member.

7. The optical fiber adapter as claimed in claim 1, wherein an engagement hole is formed within the movable member, the shutter member further comprising:
    an engagement protrusion provided at a side of the fixing portion to engage with the engagement hole.

8. The optical fiber adapter as claimed in claim 7, wherein the shutter member further comprising:
    a bump coupled to the engagement protrusion.

9. The optical fiber adapter as claimed in claim 1, wherein an engagement hole is formed within the fixing portion of the shutter member, the optical fiber adapter further comprising:
    a bump coupled to the movable member to engage with the engagement hole.

10. The optical fiber adapter as claimed in claim 1, wherein the shutter member further comprising:
    two enhancement portions extending perpendicularly from two opposing sides of the fixing portion, respectively.

* * * * *